United States Patent Office 2,965,642
Patented Dec. 20, 1960

2,965,642
CYANURIC CHLORIDE PROCESS

Esmond E. Drott and George D. Oliver, Texas City, Tex., assignors to Monsanto Chemical Company, St. Louis, Mo., a corporation of Delaware No Drawing. Filed June 19, 1958, Ser. No. 742,999

2 Claims. (Cl. 260—248)

This invention relates to an improved method for the production of cyanuric chloride by means of the vapor-phase catalytic reaction of hydrogen cyanide and chlorine.

It has been disclosed in U.S. Patent 2,762,798 that cyanuric chloride can be produced directly in a one-stage operation by the reaction of hydrogen cyanide and chlorine in the vapor phase at elevated temperatures in the presence of a fluidized activated carbon catalyst. In practice, it has been observed that yields in this process vary considerably and that it is difficult to obtain consistently high yields over extended periods of time. It has now been discovered that there is a relationship between the macropore volume of the activated carbon catalyst and its activity and, consequently, that the yield in the process may be maintained at optimum levels over long periods of operation by using activated carbon catalysts having a specified macropore volume.

According to this invention, hydrogen cyanide and chlorine are reacted together in the vapor phase at elevated temperatures in the presence of a fluidized activated carbon catalyst having a macropore volume of at least 0.15 cc./g., macropores being defined as pores having a diameter larger than 2500 A. (0.25μ), and cyanuric chloride of excellent purity is recovered from the reaction mixture.

The following example illustrates the invention but it is not intended to limit it in any manner except as it is limited in the appended claims.

Example I

A laboratory-scale version of the conventional type of reactor employed in fluid catalyst processes was used. It consisted essentially of a glass cylinder, two inches in outside diameter and approximately 50 inches in height, the latter measurement including a "disengaging section" of some 30 inches in height. Heat was supplied to the reactor by means of electrical wire wrapping covered by the necessary insulation over the entire length of the reactor. The reactor contained a fluidized bed of approximately 20 inches of activated carbon catalyst ground to a particle size within the range from 30 to 140 mesh. The catalyst was heated to a temperature of 200° C. and purged with nitrogen for a period of about 10 minutes. Then hydrogen cyanide and chlorine gas, after passing through calibrated flowmeters, were introduced in about a 1:1 mole ratio at a rate of about 4.6 and 4.9 cu. ft. per hr., respectively, through a fritted glass disc at the bottom of the reactor and passed upwardly into contact with the carbon catalyst. The catalyst was maintained in the fluidized state by adjustment of the inlet velocity of the entering gases. Since the reaction is a highly exothermic one, the temperature rose sharply as the reactants passed through the catalyst bed and external heating was regulated to maintain the temperature of the catalyst bed within the range from about 400° C. to about 470° C. while the pressure in the reaction zone was essentially atmospheric. The effluent vapors from the top of the reactor were passed into an air-cooled sublimation chamber where the crystalline solid cyanuric chloride was collected.

A number of runs were made using samples of various activated carbons having different macropore volumes. Data from these runs are tabulated below.

| Run No. | Macropore Volume of Activated Carbon Catalyst, cc./g. | Average Conv., Percent |
|---|---|---|
| A | 0.075 | 4 |
| B | 0.08 | 12 |
| C | 0.10 | 20 |
| D | 0.135 | 24 |
| E | 0.19 | 60 |
| F | 0.285 | 68 |
| G | 0.315 | 70 |

Macropore volume of the activated carbons was determined using a mercury porosimeter (Aminco-Winslow, Cat. No. 5-7105, manufactured by American Instrument Co., Inc.), as follows:

A sample of the activated carbon of known weight was placed in a penetrometer (a glass tube with a capillary stem graduated in divisions of 0.002 ml.). The penetrometer was then placed in a filling device. The filling device was evacuated and the penetrometer filled with mercury. Thereafter, the penetrometer was transferred to a pressure chamber wherein pressures from 15 to 3000 p.s.i. were applied to the mercury. The graduated stem of the penetrometer was visible at all times through a window in the pressure chamber. As the pressure was raised, mercury was forced into smaller and smaller pores, the volumes of which were continuously being indicated by the mercury as it dropped in the stem of the penetrometer. The smallest pore diameter entered by the mercury under pressure was determined by the relationship $$D = \frac{175}{P}$$

where D equals the diameter of the pore in microns and P equals the absolute pressure in lb. per sq. in. Pore diameters were determined from the absolute pressure on the sample. In general, the weight of the mercury and atmospheric pressure was included when calculating absolute pressure of the sample. Pore volumes were read directly from the penetrometer stem.

It is obvious from the data recorded above that the yield of cyanuric chloride and thus the activity of the catalyst varies with the macropore volume of the catalyst and that optimum yield may be obtained by proper choice of the activated carbon catalyst.

While the example represents a preferred embodiment of the invention, substantial variation in reaction conditions may be made without departing from the scope of the invention. The reaction temperature may vary, for example, from about 350° C. to about 1000° C., but preferably the reaction temperature is maintained in the range from about 350° C. to about 600° C. Little or no cyanuric chloride forms below a temperature of 350° C.

The heat required to initiate this exothermic reaction may be supplied, as indicated in the example, by initially heating the catalyst bed or by preheating the reactant gases. In either case, the initial temperature should be maintained suitably below the desired final reaction temperature and yet be high enough to initiate the reaction at a satisfactorily high velocity. The exact temperature employed will, of course, depend upon the rate of radiation or other cooling in the reactor, the space velocity of the entering gases, etc. and may be calculated for the particular conditions employed. Generally, the catalyst bed is heated to a temperature of at least 150° C. when that method is employed or, if the reactants are preheated, their temperature is regulated several hundred degrees below the desired maximum off gas temperature and space velocity is regulated within a range such that the catalyst bed remains fluidized. Space velocities in the range from 0.05 to 0.15 reciprocal second are usually satisfactory.

Although some advantage is obtained from a slight excess of chlorine as employed in the example, the exact stoichiometric proportions of the hydrogen cyanide and chlorine reactants may be used, i.e., one mole of hydrogen cyanide may be fed for each mole of chlorine fed.

The process of the invention may also be operated at elevated pressures, i.e., pressures above atmospheric, if desired.

What is claimed is:

1. In the process for the preparation of cyanuric chloride wherein hydrogen cyanide and chlorine are reacted in the vapor phase at a reaction temperature of at least 350° C. in the presence of a fluidized activated carbon-catalyst, the improvement which comprises employing activated carbon having a macropore volume in the range from about 0.15 cc./g. to about 0.4 cc./g., macropores being defined as pores having a diameter larger than 2500 A.

2. In the process for the preparation of cyanuric chloride wherein hydrogen cyanide and chlorine are reacted in the vapor phase, in proportions such that a slight excess of chlorine is present, at a reaction temperature in the range from about 400° C. to about 470° C., and in the presence of a fluidized activated carbon catalyst, the improvement which comprises employing activated carbon having a macropore volume in the range from about 0.15 cc./g. to about 0.4 cc./g., macropores being defined as pores having a diameter larger than 2500 A.

References Cited in the file of this patent

UNITED STATES PATENTS 2,762,798    Hardwicke _____ Sept. 11, 1956